US009277349B2

(12) United States Patent
Mankowski et al.

(10) Patent No.: US 9,277,349 B2
(45) Date of Patent: Mar. 1, 2016

(54) METHOD OF PROCESSING AN INCOMING COMMUNICATION SIGNAL AT A MOBILE COMMUNICATION DEVICE

(71) Applicant: BlackBerry Limited, Waterloo (CA)

(72) Inventors: Peter Mankowski, Waterloo (CA);
Weimin Rang, Stouffville (CA);
Xiaowei Wu, Waterloo (CA); Yaran Nan, Kitchener (CA)

(73) Assignee: BlackBerry Limited, Waterloo, Ontario (CA)

( * ) Notice: Subject to any disclaimer, the term of this patent is extended or adjusted under 35 U.S.C. 154(b) by 202 days.

(21) Appl. No.: 13/915,886

(22) Filed: Jun. 12, 2013

(65) Prior Publication Data
US 2014/0370870 A1 Dec. 18, 2014

(51) Int. Cl.
*H04W 4/00* (2009.01)
*H04W 4/02* (2009.01)
*H04W 4/04* (2009.01)

(52) U.S. Cl.
CPC ............. *H04W 4/006* (2013.01); *H04W 4/025* (2013.01); *H04W 4/046* (2013.01)

(58) Field of Classification Search
CPC ..... H04W 48/04; H04W 4/027; H04W 88/02; H04W 52/283; H04M 1/72577; H04M 1/6075; H04M 1/72569
USPC ......................................................... 415/418
See application file for complete search history.

(56) References Cited

U.S. PATENT DOCUMENTS

| | | | |
|---|---|---|---|
| 5,550,738 A * | 8/1996 | Bailey et al. | 455/456.5 |
| 5,675,321 A | 10/1997 | McBride | |
| 7,119,800 B2 | 10/2006 | Kent et al. | |
| 7,486,950 B2 | 2/2009 | Losch | |
| 7,856,203 B2 | 12/2010 | Lipovski | |
| 8,126,435 B2 | 2/2012 | George | |
| 8,165,881 B2 | 4/2012 | Kirsch et al. | |
| 8,401,578 B2 | 3/2013 | Inselberg | |
| 8,442,511 B2 | 5/2013 | Woods et al. | |
| 2003/0160692 A1* | 8/2003 | Nonaka | 340/539.11 |
| 2006/0211499 A1 | 9/2006 | Bengtsson et al. | |
| 2008/0198145 A1 | 8/2008 | Knowles et al. | |
| 2009/0221279 A1* | 9/2009 | Rutledge | 455/418 |
| 2010/0216509 A1* | 8/2010 | Riemer et al. | 455/557 |
| 2011/0018814 A1 | 1/2011 | Kruglick | |
| 2011/0065375 A1 | 3/2011 | Bradley | |
| 2011/0096036 A1 | 4/2011 | McIntosh et al. | |

(Continued)

FOREIGN PATENT DOCUMENTS

DE 19801566 A1 10/1999

OTHER PUBLICATIONS

European Patent Office Search Report dated Nov. 4, 2013 for Application No./Patent No. 13171619.3-1858.

(Continued)

*Primary Examiner* — Daniel Lai
(74) *Attorney, Agent, or Firm* — Conley Rose, P.C.; J. Robert Brown, Jr.

(57) ABSTRACT

A mobile communication device and method of communication is disclosed. A communication signal having a message class is received at the mobile communication device conveyed by a vehicle. A message class of the received communication at the mobile communication device is obtained. A station of motion of the vehicle is determined at the mobile communication device. The message class and the determined state of motion is used to select an action to relay the communication to a driver of the vehicle.

15 Claims, 5 Drawing Sheets

(56) References Cited

U.S. PATENT DOCUMENTS

| | | |
|---|---|---|
| 2011/0109553 A1 | 5/2011 | Tsao et al. |
| 2013/0044100 A1 | 2/2013 | King |
| 2013/0045689 A1* | 2/2013 | Grost et al. .................. 455/41.3 |

OTHER PUBLICATIONS

Wennemar, Dietmar Frank, et al.; U.S. Appl. No. 14/011,511, filed Aug. 27, 2013; Title: Function Selection by Detecting Resonant Frequencies; 33 pages.

Riskedal, Espen; "Drum Analysis"; University of Bergen; Department of Informatics; https://bora.uib.no/bitstream/handle/1956/1705/Masteroppgave%E2%80%90riskedal.pdf?sequence=1; Feb. 11, 2002; 106 pages.

European Extended Search Report; Application No. 14182529.9; Nov. 10, 2014; 9 pages.

Office Action dated Mar. 25, 2015; U.S. Appl. No. 14/011,511, filed Aug. 27, 2013; 23 pages.

Notice of Allowance dated Jul. 17, 2015; U.S. Appl. No. 14/011,511, filed Aug. 27, 2013; 9 pages.

\* cited by examiner

METHOD OF PROCESSING AN INCOMING COMMUNICATION SIGNAL AT A MOBILE COMMUNICATION DEVICE

BACKGROUND

The use of a mobile phone or other mobile communication device by a driver of a moving vehicle has been known to cause the driver to be inattentive to his driving, resulting in a dangerous driving situation which may result in a crash or accident. Education and law enforcement are traditional methods of combatting such behavior of drivers. However, such measures are often reliant upon the personal responsibility of the driver. Even a normally responsible driver may find himself in a situation in which he decides to momentarily switch his attention away from driving to respond to a message that is sufficiently urgent, thereby endangering his life and the lives of those around him.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
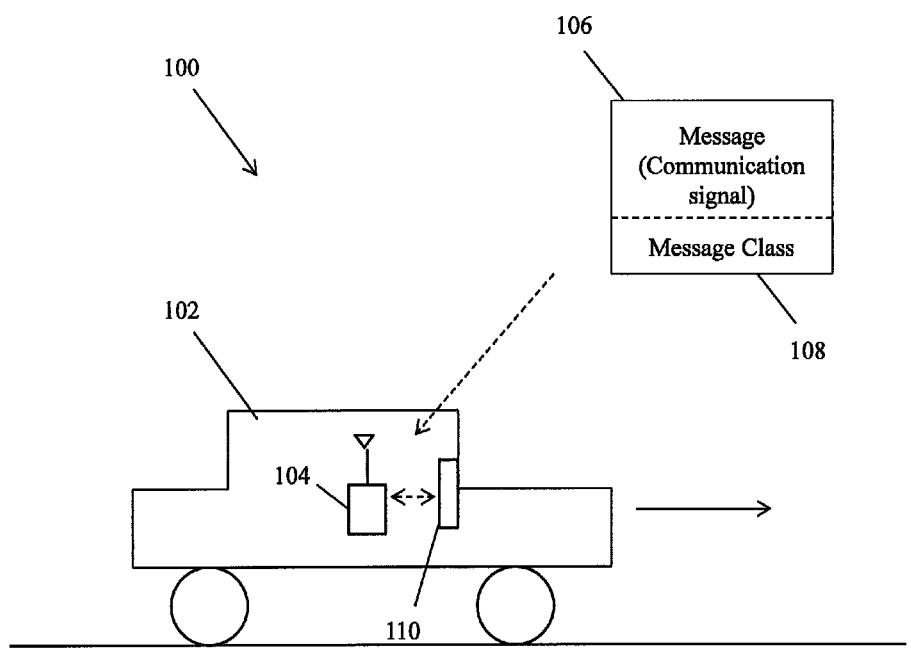
FIG. 1 shows an illustrative communication system suitable for handling a message received while driving.

FIG. 1 shows an illustrative communication system 100 suitable for handling a message received while driving. The system 100 includes a vehicle 102 that may be a car, truck, or other suitable vehicle that is driven by a driver. The vehicle 102 conveys a mobile communication device 104. In general, the mobile communication device 104 is a hand-held device for two-way communication, such as a cellular phone, a smartphone, a tablet computer, etc. For purposes of discussion, the mobile communication device 104 may be alternately referred to herein as a "mobile phone." The mobile communication device 104 may be capable of sending and receiving a communication signal or message 106 wirelessly to and from a communication network. A message 106 may refer to any form of communication signal including, for example, a voice communication, email, text, instant messaging, a video-telephonic signal, etc. The message 106 may be received from a wireless communication network. The user of the mobile communication device 104 may be a driver of the vehicle in motion, in which case receiving the incoming message may cause the driver to be inattentive to driving conditions, which may result in an accident. Therefore, the message 106 of the present application may include a message class 108 that may be used at the mobile communication device 104 to present the message 106 to the driver at an appropriate time when the driving conditions are generally acceptable as safe or in an appropriate manner that allows the driver to not be distracted by the message 106. The mobile communication device 104 may obtain the message class 108 upon receiving an incoming message 106 and perform an action related to delivering the message 106 to the driver using the message class 108 and the methods disclosed herein.

The vehicle 102 may include an interactive display 110 that may be a dashboard display in one embodiment. The display 110 may include a visual display for displaying text and/or images and may include a processor, memory, etc. The display 110 may also include a speaker and/or microphone to facilitate voice communication. The interactive display 110 may be responsive to a touch or selection made by the driver. Additionally, the display 110 may be programmed to respond to certain vocal commands by the driver, such as "Accept call" or "Ignore message," etc. The mobile phone 104 may be able to communicate with a processor (not shown) at the display 110 in order to send messages back and forth between the mobile phone 104 and the display 110. In one embodiment, the mobile phone 104 may communicate with the vehicle 102 via Bluetooth communication technology or other suitable communication technology. Thus, a message 106 received at the mobile phone 104 may be sent to the display 110 of the vehicle, wherein the display 110 may display the message as a text, an audio communication such as text-to-speech, or as a phone call. In one embodiment, an interface of the mobile phone 104 may be reproduced in total or in part at the display 110 and a selection made by the driver at an interface of the display 110 may be relayed to the mobile phone 104.

Figure 2:
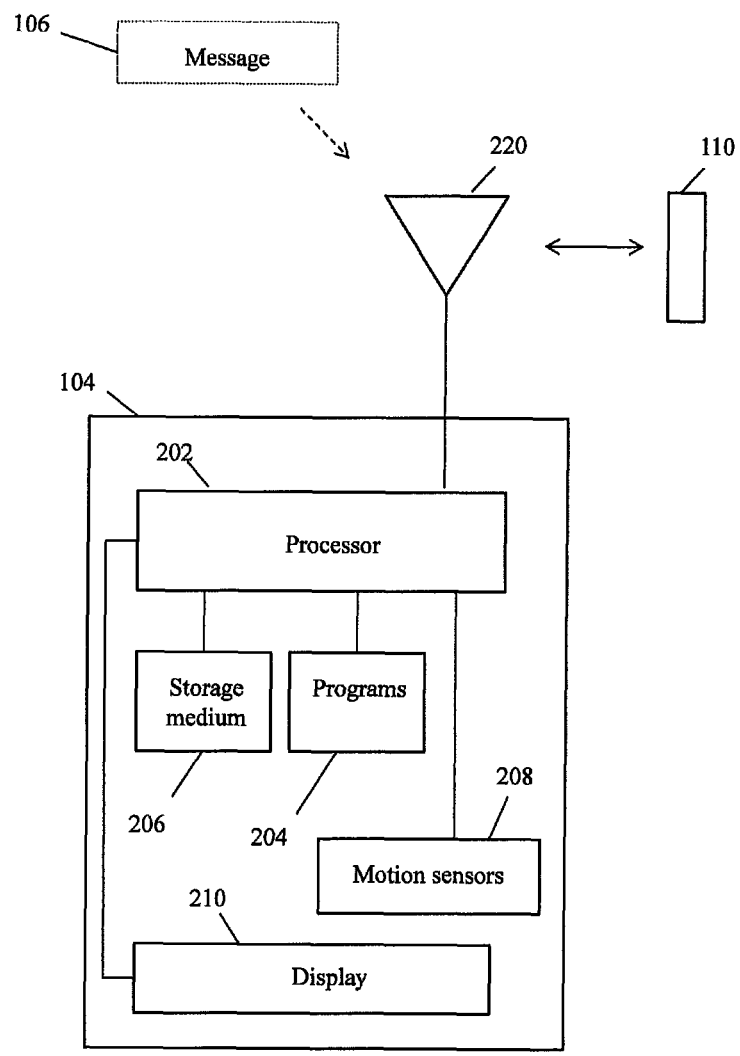
FIG. 2 shows a schematic diagram of an illustrative mobile phone according to an embodiment of the present invention.

FIG. 2 shows a schematic diagram of an illustrative mobile phone 104 of the present application. The mobile phone 104 includes an antenna 220 for sending and receiving a wireless message 106 to and from a communication network. In addition, the antenna 220 may be used to send signals back and forth to the display 110 of the vehicle. The mobile phone 104 may include a processor 202 that receives an incoming message 106 from the antenna 220. The processor 202 may have access to a set of programs 204 providing instructions for determining an action to take with respect to the received message. The processor 202 may also have access to a storage medium 206 that may be used to store various parameters, messages, driver's logs, as well as to store a message 106. The mobile phone 104 may further include a display 210 that may display the received message as a text and/or an image.

Motion sensors 208 are integrated into the mobile phone 104. The motion sensors 208 may include accelerometers, gyroscopes, orientation sensors, among others. The motion sensors 208 may be sensitive to motion and/or vibration in either or all of x, y, and z directions along a coordinate system of the mobile phone 104. When conveyed in a moving vehicle, the motion sensors 208 may provide one or more signals to processor 202 that are related to various motions and/or vibrations experienced by the mobile phone 104 while the vehicle is being driven, thus providing a state of motion of the vehicle. The processor 202 may use the vibration signals to create a log of a driving scenario. A driving scenario may include a sequence of events that occur during driving form a first location to a second location. In various aspects, the sequence of events may be indicative of a behavior of the driver in driving from the first location to the second location, since any two drivers may drive over the same terrain differently. An event may include, for example, driving at a selected speed for given duration, stopping (at a stop light, etc.) for a selected duration, turning right, turning left, accelerating, decelerating, shifting gears, driving over a pothole or speed bump, etc. The recorded log may include a record of various vibrations or motion signals (constant speed, acceleration, deceleration, etc.) that are detected by the motion sensors 208 and that are related to the driving scenario and/or the events that occur during the driving scenario. The characteristics of the vibrations, i.e., duration, amplitude, frequency, direction, etc. may be used to identify the event.

Figure 3:
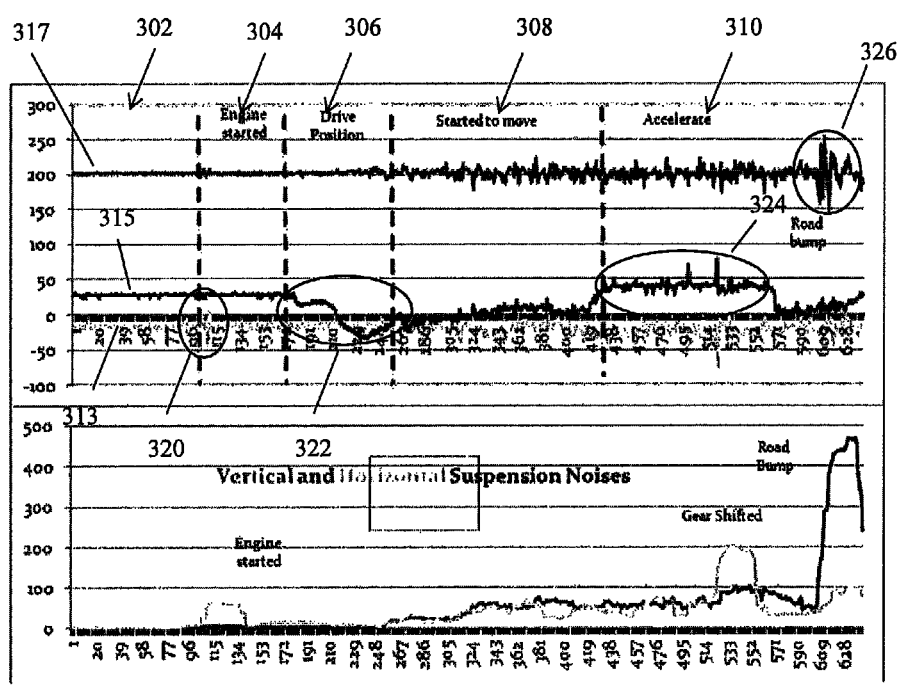
FIG. 3 shows a graph of an illustrative driving scenario which may be monitored using the mobile phone and motion sensors integrated therein.

FIG. 3 shows a graph of an illustrative driving scenario which may be monitored using the mobile phone 104 and its integrated motion sensors 208. In the illustrative driving scenario, the vehicle is turned off for time period 302 which lasts from 0 seconds to about 96 seconds. During time period 304 (from about 96 seconds to about 172 seconds) the car engine is started. During time period 306 (from about 172 seconds to about 260 seconds), the car is shifted into the drive gear. During time period 308 (from about 260 seconds to about 430 seconds), the vehicle starts to move. During time period 310 (after about 260 seconds), the vehicle accelerates. Around 609 seconds, the vehicle hits a road bump. Vibrations associated with each of these activities are received at the motion sensors 208 and are displayed in logs 313, 315 and 317. Log 313 records vibrations occurring in a direction extending from the front of the vehicle to the back of the vehicle using a y-directed sensor. Log 315 records vibrations occurring in an up-and-down direction using a z-directed sensor. Log 317 records vibrations in a left-to-right direction using an x-directed sensor.

During time period 302, the vehicle is turned off and none of the motion sensors 208 receive any significant vibrations. However, during time period 304, the sensor along the y-axis records vibrations associated with starting of the engine at event 320. During time period 306, the z-sensor records vibrations associated with shifting of the vehicle into a drive gear (event 322). During time period 310, the z-sensor records the acceleration of the vehicle (event 324) and the x-sensor records vibrations associated with the vehicle running over a road bump (event 326).

In one embodiment, the mobile phone 104 may record logs 313, 315 and 317 for a plurality of repetitions of the driving scenario and a statistical model of the driving scenario may be determined from the plurality of logs. The processor 202 may further record the time of day and week at which the logs are obtained in order to identify the logs to a given driving scenario, i.e., driving to work at 7:30 a.m. on Mondays, driving to tennis lessons at 2 p.m. on Saturday, etc. Since the driver generally takes a same route between a first location and a second location, processor 202 may arrive at a statistical model of the behavior of the driver for a particular terrain or driving scenario. In one embodiment, the statistical model may include a moving average of the logs, i.e., the model uses a selected number of most recent repetitions of the driving scenario. Thus, when the driver repeats the driving scenario to produce a new log, the oldest log may be thrown out and the new (most recent) log may be included with the remaining logs to compute the statistical model. In this manner, the statistical model may be continually updated to reflect any variation or changes in the driver's behavior.

In one embodiment, the mobile phone 104 may determine how and when to relay an incoming message 106 to the driver. In general, the mobile phone 104 determines how to relay the incoming message in a manner that reduces the danger (increase the safety) of relaying the message 106 and that complies with an urgency of the message 106. The mobile phone 104 makes this decision based on a determined state of motion of the vehicle and/or a determined context of the vehicle (i.e., where the vehicle is within the driving scenario) and the message class 108 of the received message 106.

A message class 108 may be a parameter that indicates a relative importance of the message to the driver. The relative importance may be taken into account when deciding when and how to relay the message to the driver. A message class 108 may have various values. In an illustrative embodiment, the message class 108 may be either "Normal," "Urgent," "Custom," or "Spam." A message that is of a "Normal" message class may be any standard communication that a person may have during a day, but which has no immediate urgency that justifies distracting or interrupting the driver while driving. A message that is "Urgent" may require the driver's attention regardless of the state of motion of the vehicle. A "Custom" message may include messages that are customized to the driver and may be related to the particular trip the driver is taking. Examples of custom messages may include: "Where are you?" "How long before you arrive?" "Please remember to stop at grocery store," etc. A message that is "Spam" may be junk email or messages that may be ignored or deleted automatically. The message 106 may be relayed to the driver based on the message class 108 and a context of the driving scenario within which the message is received.

The processor 202 may determine an action to take with respect to the message based on the statistical model of the driving scenario and the message class of the received message. Given that the model provides a pattern by which the driver runs through a selected driving scenario, the model and a state of motion that is measured when the message is received may be used to determine the context in which the message is received and therefore how to relay the incoming message to the driver. Also, the mobile phone 104 may be able to anticipate an upcoming event within the driving scenario from the model. In one example, the mobile phone 104 may determine from the model that the vehicle will come to a stop within about 30 seconds. The mobile phone 104 may then review that the message class is "Normal" and decide to delay relaying the message to the driver until the vehicle comes to a stop. In another example, the mobile phone may determine from the model that the vehicle is about to enter a highway. For an "Urgent" message class, the mobile phone may decide to relay the message to the driver once the vehicle reaches a cruising speed and to relay the message to the vehicle display 110 in order to reduce distractions to the driver. In addition, the mobile phone 104 may select a format with which to present the message. For example, a text message that is urgent but that is received under dangerous driving conditions may be converted to audio using a text-to-speech program so that the driver may keep hands on the driver's wheel.

Figure 4:
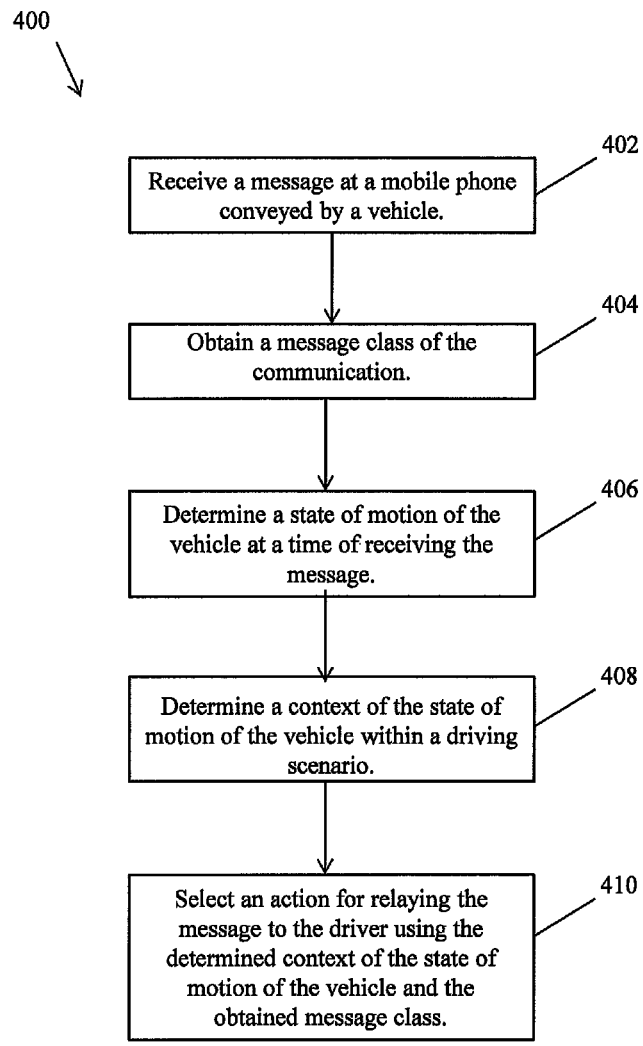
FIG. 4 shows a flowchart of an illustrative process for relaying a message from a mobile phone to a driver of a vehicle.

FIG. 4 shows a flowchart 400 of an illustrative process for relaying a message from a mobile phone 104 to a driver of a vehicle. In block 402, a message is receive at the mobile phone 104, wherein the mobile phone 104 is being conveyed by the vehicle. In block 404, the mobile phone obtains a message class of the message. In block 406, the mobile phone determines a state of motion of the vehicle at the time of receiving the message. In block 408, the mobile phone determines a context of the state of motion of the vehicle with respect to a driving scenario. In block 410, an action is selected related to delivering the message to the driver based on the message class and the state of motion and/or context of the driving scenario.

Figure 5:
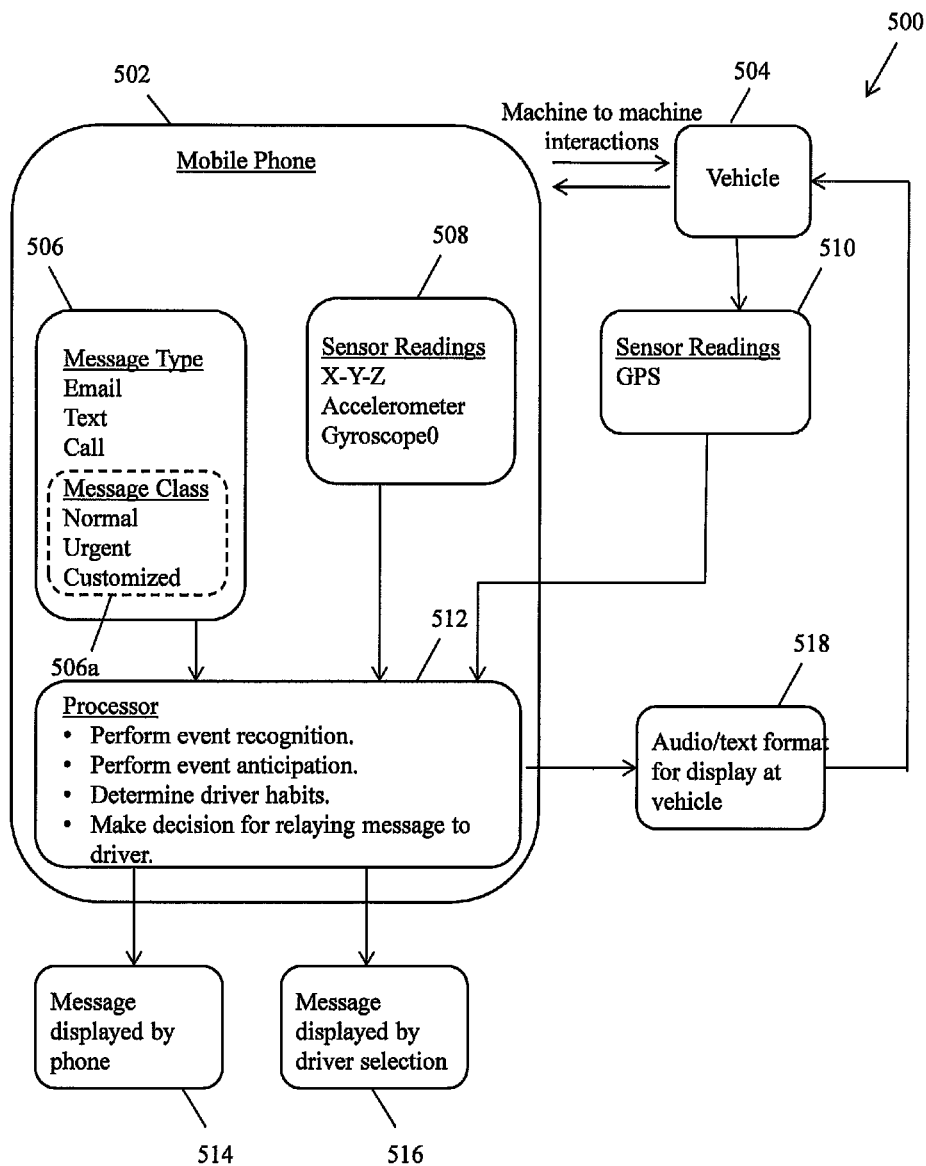
FIG. 5 shows a schematic diagram of an interaction between a mobile phone conveyed in a vehicle and a display of the vehicle for the purpose of relaying an incoming message to the driver of the vehicle.

FIG. 5 shows a schematic diagram 500 of an interaction between a mobile phone 502 conveyed in a vehicle 504 and a display of the vehicle 504 for the purpose of relaying an incoming message to the driver of the vehicle 504. Mobile phone 502 and vehicle 504 interact with each other using a two-way M2M (machine-to-machine) communication. The mobile phone 502 receives a message 506 which may include an email, a text, a phone call or another type of communication. The mobile phone 502 also receives the message class 506a of the message 506. The mobile phone 502 also receives motion data 508 from various X-Y-Z sensors, accelerometers and/or gyroscopes. The vehicle 504 may supply Global Positioning System (GPS) coordinates 510 which may be relayed to the mobile phone 502 for making its decision. In other embodiments, GPS coordinates may be determined at the mobile phone 502.

The message class, sensed motions and/or GPS data are sent to the processor 512, which is generally the processor of the mobile phone 502. The processor 512 may perform, for example, event recognition, event anticipation and/or determining of a user habit. From the determined event, user habit and/or event anticipation, the processor 512 makes a decision on how to relay the message to the driver. For example, the processor 512 may choose to display the message at a mobile phone display 514. Alternatively, the processor 512 may choose to notify the driver of an incoming message and display the message when the message is selected by the driver (block 516). Alternatively, the processor 512 may select an audio or text format for either displaying the message at the vehicle or a text-to-speech audio presentation using a speaker at a vehicle display 518. Other modes for relaying the message to the driver may also be selected by the processor 512.

Therefore, in one aspect, a method of communication is disclosed that includes: receiving a communication signal having a message class at a mobile communication device conveyed by a vehicle; obtaining a message class of the received communication at the mobile communication device; determining, using a processor, a state of motion of the vehicle at the mobile communication device; and using the message class and the determined state of motion to select an action to relay the communication to a driver of the vehicle.

In another aspect, a mobile communication device for use in a vehicle is disclosed that includes: a module configured to receive a communication from a network; a motion sensor configured to sense vibrations resulting from motion of the vehicle; and a processor configured to: determine a state of motion of the vehicle based on the sensed vibrations upon receiving the communication, obtain a message class of the communication, and select an action to relay the communication to a user of the mobile communication device from the determined state of motion and the obtained message class.

In another aspect, a method of providing a message to a driver of a vehicle is disclosed that includes: receiving the message at a mobile communication device conveyed by the vehicle, wherein the message includes a message class; obtaining the message class of the received message; determining a state of motion of the vehicle at the mobile communication device using a sensor; and using a processor to select an action for providing the message to the driver based on the determined state of motion of the vehicle and the obtained message class.

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of communication, comprising:
   receiving a communication having a message class at a mobile communication device carried by a vehicle;
   obtaining the message class of the received communication at the mobile communication device;
   sensing vibrations resulting from motion of the vehicle;
   determining, using a processor, a state of motion of the vehicle at the mobile communication device based on the sensed vibrations upon receiving the communication;
   comparing the present state of motion to a model indicative of a driving scenario;
   determining a context of the state of the motion based on the comparison; and
   using the message class, the determined state of motion, and the determined context of the state of motion to select an action to relay the communication to a driver of the vehicle.

2. The method of claim 1, wherein the model includes at least one log of vibrations recorded during a previous run through the driving scenario.

3. The method of claim 2, wherein the vibrations are recorded using a motion sensor integrated into the mobile communication device.

4. The method of claim 3, wherein the motion sensor includes at least one of: an accelerometer; a gyroscope; and an x-y-z motion sensor.

5. The method of claim 1, further comprising using the determined state of motion to anticipate an event in the driving scenario and using the anticipated event and the message class to relay the communication signal to the driver.

6. The method of claim 1, wherein the selected action includes selecting at least one of: a display for presenting the communication; a format for presenting the communication; and a time at which to present the communication.

7. The method of claim 1, wherein the received communication further comprises at least one of: an email message received from a wireless network; a text message received from a wireless network; and an incoming phone call received from a wireless network.

8. A mobile communication device for use in a vehicle, comprising:
   a module configured to receive a communication from a network;

a motion sensor configured to sense vibrations resulting from motion of the vehicle; and a processor configured to:
determine a state of motion of the vehicle based on the sensed vibrations upon receiving the communication,
obtain a message class of the communication,
compare the state of motion to a model indicative of a driving scenario,
determine a context of the state of the motion based on the comparison, and
select an action to relay the communication to a user of the mobile
communication device from the determined state of motion, the obtained message class, and the determined context of the state of motion.

9. The mobile communication device of claim 8, wherein the model includes at least one log of vibrations recorded during a previous run through the driving scenario.

10. The mobile communication device of claim 9, wherein the motion sensor includes at least one of: an accelerometer; a gyroscope; and an x-y-z motion sensor.

11. The mobile communication device of claim 8, wherein the processor is further configured to use the determined state of motion to anticipate an event in the driving scenario and use the anticipated event and the message class to relay the communication signal to the driver.

12. The mobile communication device of claim 8, wherein the processor is further configured to select the action from at least one of: selecting a display for presenting the communication signal; selecting a format for presenting the communication signal; and selecting a time at which to present the communication signal.

13. A method of providing a message to a driver of a vehicle, comprising:
receiving the message at a mobile communication device carried by the vehicle, wherein the message includes a message class;
obtaining the message class of the received message;
determining a state of motion of the vehicle at the mobile communication device using a motion sensor upon receiving the message, wherein the motion sensor is configured to sense vibrations resulting from motion of the vehicle;
comparing the determined state of motion to a model indicative of the behavior of a driving scenario;
determining a context of the state of the motion based on the comparison; and
using a processor to select an action for providing the message to the driver based on the determined state of motion of the vehicle, the determined context of the state of motion, and the obtained message class.

14. The method of claim 13, wherein determining the context further comprises determining the state of motion upon receiving the message.

15. The method of claim 13, further comprising using the determined state of motion to anticipate an event and using the anticipated event and the message class to relay the message to the driver.

* * * * *